United States Patent
Newcombe et al.

(10) Patent No.: US 10,237,481 B2
(45) Date of Patent: Mar. 19, 2019

(54) EVENT CAMERA FOR GENERATION OF EVENT-BASED IMAGES

(71) Applicant: Facebook Technologies, LLC, Menlo Park, CA (US)

(72) Inventors: Richard Andrew Newcombe, Seattle, WA (US); Michael Hall, Seattle, WA (US); Xinqiao Liu, Medina, WA (US); Steven John Lovegrove, Woodinville, WA (US); Julian Straub, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 102 days.

(21) Appl. No.: 15/490,679

(22) Filed: Apr. 18, 2017

(65) Prior Publication Data
US 2018/0302562 A1   Oct. 18, 2018

(51) Int. Cl.
H04N 5/232 (2006.01)
H04N 5/351 (2011.01)
G06F 17/16 (2006.01)

(52) U.S. Cl.
CPC ......... *H04N 5/23245* (2013.01); *H04N 5/351* (2013.01); *G06F 17/16* (2013.01)

(58) Field of Classification Search
CPC .... H04N 5/23245; H04N 5/351; H04N 5/335; H04N 5/353; H04N 5/2353; H04N 5/3535; H04N 5/3537; G06F 17/16; G06F 17/14; G06F 3/00; G06T 2207/10
See application file for complete search history.

(56) References Cited

U.S. PATENT DOCUMENTS

2010/0182468 A1   7/2010  Posch et al.
2014/0363049 A1*  12/2014 Benosman ............. G06T 7/269
                                              382/103

(Continued)

FOREIGN PATENT DOCUMENTS

EP         2887009 A1      6/2015
KR    10-2017-0027107 A    3/2017
WO    WO 2015/145017 A1   10/2015

OTHER PUBLICATIONS

Jurgen Kogler, "Event-based stereo matching approaches for frameless address event stereo data", Sep. 26, 2011, pp. 676-680.*

(Continued)

*Primary Examiner* — Twyler L Haskins
*Assistant Examiner* — Akshay Trehan
(74) *Attorney, Agent, or Firm* — Fenwick & West LLP

(57) ABSTRACT

An imaging device operates as an event camera. The device includes an event sensor and a controller. The sensor comprises a plurality of photodiodes that asynchronously output data values corresponding to relative intensity changes within a local area. The controller populates an event matrix based in part on data values asynchronously received from the sensor and positions of photodiodes associated with the received data values over a first time period. The controller populates a change matrix based in part on a threshold intensity value and the photodiodes associated with the received data values over the first time period, and generates an image for the first time period using the event matrix and the change matrix.

17 Claims, 7 Drawing Sheets

(56) References Cited

U.S. PATENT DOCUMENTS

| | | | | |
|---|---|---|---|---|
| 2015/0110357 | A1* | 4/2015 | Bala | G06K 9/00771 |
| | | | | 382/104 |
| 2016/0070673 | A1* | 3/2016 | Wang | G06F 17/141 |
| | | | | 708/403 |
| 2016/0078001 | A1* | 3/2016 | Wang | G06F 17/141 |
| | | | | 708/405 |
| 2016/0094796 | A1* | 3/2016 | Govil | H04N 5/3456 |
| | | | | 348/295 |
| 2016/0094814 | A1* | 3/2016 | Gousev | G06K 9/6267 |
| | | | | 348/143 |
| 2016/0132499 | A1* | 5/2016 | Mercier | G06K 9/00711 |
| | | | | 348/207.1 |
| 2016/0320834 | A1* | 11/2016 | Lee | G06K 9/4604 |
| 2017/0278221 | A1* | 9/2017 | Ji | G06T 5/002 |

OTHER PUBLICATIONS

Barua Souptik, "Direct face detection and video reconstruction from event cameras", Mar. 7, 2016, pp. 1-5.*
PCT International Search Report and Written Opinion, PCT Application No. PCT/US2018/015160, dated May 4, 2018, 12 pages.
European Extended Search Report, European Application No. 18161244.1, dated Jul. 4, 2018, 16 pages.
Kogler, J. et al., "Event-Based Stereo Matching Approaches for Frameless Address Event Stereo Data," ECCV 2016 Conference, Lecture Notes in Computer Science, Sep. 26, 2011, pp. 674-685.
Miyatani, Y. et al., "Direct Face Detection and Video Reconstruction from Event Cameras," 2016 IEEE Winter Conference on Applications of Computer Vision, Mar. 7, 2016, pp. 1-9.
Lichtsteiner, P. et al., "A 128×128 120 dB 15 μs Latency Asynchronous Temporal Contrast Vision Sensor," IEEE Journal of Solid-State Circuits, Feb. 2008, pp. 566-576, vol. 43, No. 2.

* cited by examiner

```
┌─────────────────────────────────────────────────┐
│ Capture data in accordance with image instructions │
│                      410                         │
└─────────────────────────────────────────────────┘
                        │
                        ▼
┌─────────────────────────────────────────────────┐
│         Generate image based on captured data    │
│                      420                         │
└─────────────────────────────────────────────────┘
```

EVENT CAMERA FOR GENERATION OF EVENT-BASED IMAGES

BACKGROUND

The present disclosure generally relates to imaging systems, and specifically relates to event cameras.

A traditional camera operates by integrating light-ray parameters over a specified period of time. This integration is synchronous and requires throughput of a large volume of data, and in turn results in a heavy power and memory requirement of the operating camera. Furthermore, many pixels in an image are static, and do not change, or change only slightly between frame captures. Thus a high volume of data is being unnecessarily generated for these unchanging pixels.

SUMMARY

An event camera images objects in a local area. The event camera is an imaging device that includes an event sensor and a controller. The event sensor includes a plurality of photodiodes and is configured to operate in one or modes including an event mode. An event sensor operating in the event mode asynchronously outputs data values corresponding to relative intensity changes within the local area. A data value output by each respective photodiode, of the plurality photodiodes, is based at least in part on a difference of a value previously output by the photodiode and an intensity value captured by the photodiode relative to an intensity threshold value. The controller populates an event matrix based in part on data values asynchronously received from the sensor and positions of photodiodes associated with the received data values over a first time period. The controller populates a change matrix based in part on the threshold intensity value and the photodiodes associated with the received data values over the first time period, and generates an image for the first time period using the event matrix and the change matrix. In event mode of operation there is no image "frame," accordingly the event sensor is able to output data at a much faster rate than, e.g., a traditional imaging sensor which reads out, in a synchronous manner, a bit value for every photodiode in its sensor in the form of an image frame.

In some embodiments, the imaging device can also operate in a conventional mode and generate conventional image frames. The imaging device may use the conventional image frames to facilitate generation of images using image data generated in the event mode.

The event camera may be part of, e.g., a head-mounted display (HMD), a cellphone, a machine vision system, an eye tracking system, a depth camera assembly, etc. In some embodiments, the event camera may be part of a HMD in a virtual reality (VR) system, an augmented reality (AR) system, a mixed reality (MR) system, or some combination thereof.

BRIEF DESCRIPTION OF THE DRAWINGS

FIG. 3 is an example of an image equation that is populated over a first time period, according to an embodiment.

FIG. 4 is a flow chart illustrating a process for generating an image using an event camera, in accordance with one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
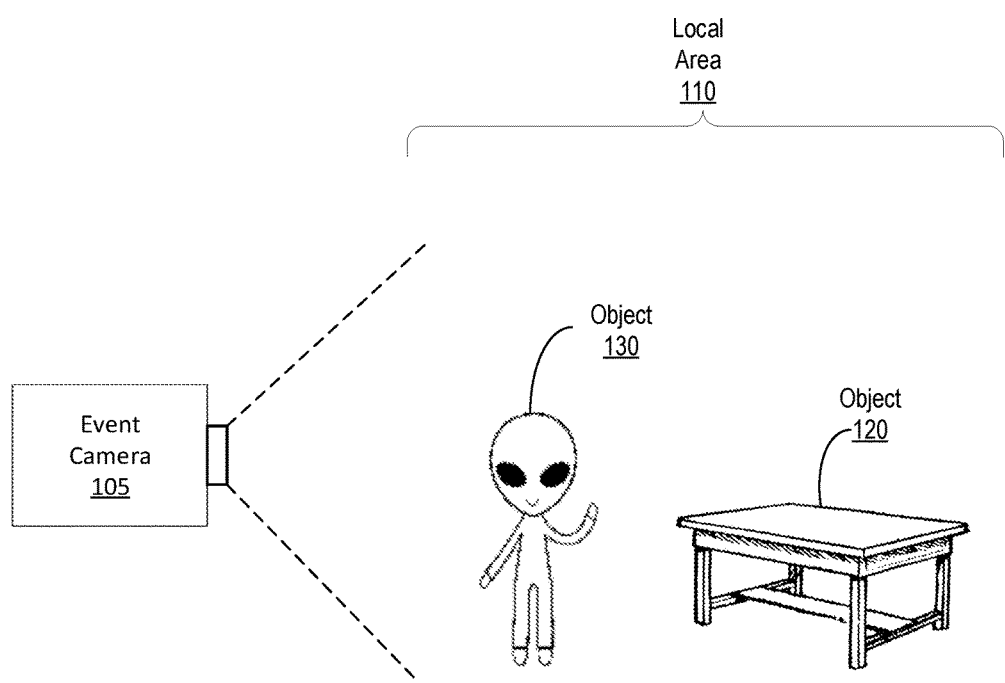
FIG. 1 is an illustration of an environment in which an event camera operates, in accordance with an embodiment.

FIG. 1 illustrates an event camera 105 imaging a local area 110, according to an embodiment. The event camera 105 is a camera that captures image information corresponding to relative intensity changes within a local area 110. The event camera 105 may be part of, e.g., a head-mounted display (HMD), a cell phone, a machine vision apparatus, or some other platform that uses an imaging device.

The event camera 105 includes an event sensor. The event sensor includes a plurality of photodiodes that each independently and in continuous time quantizes local relative intensity changes. For each photodiode, the relative intensity changes are measure relative to a previous intensity value of the photodiode. In an event mode of operation, for each photodiode, if a change in intensity over a particular time period is more than a threshold value, the photodiode outputs a specific photodiode data value (i.e., a photodiode address event (AE) occurs). If the change in intensity is less than the threshold value, no data value is output. Accordingly, an AE may not occur for each photodiode. Additionally, as relative changes in intensity occur asynchronously, photodiode AEs are also asynchronously output from the event sensor. Note that in this mode of operation there is no image "frame." Thus, the event camera 105 is able to output data at a much faster rate than, e.g., a traditional imaging sensor which reads out, in a synchronous manner, a bit value for every photodiode in its sensor in the form of an image frame.

In some embodiments, the event sensor may be configured to also operate in a conventional mode. An event sensor operating in a conventional mode functions as a traditional imaging sensor. For example, in a conventional mode of operation each photodiode of the event sensor outputs a photodiode value that is based on an amount of light collected over an integration period (e.g., how long a shutter is open). And an image frame is output that includes data from each of the photodiodes. In some embodiments, the event camera 105 may be configured to dynamically select a particular mode of operation, or may be instructed to switch to a particular mode of operation.

An object 130 in the local area 110 may be moving relative to the event camera 105 causing associated changes in relative intensity values. Photodiodes in the event sensor would output data values if a relative change is over their associated threshold values (i.e., a photodiode AE occurs). In contrast, an object 120 that is static relative to the event camera 120 would have very few photodiodes whose relative intensity values are above the threshold value. Accordingly, in the event mode, there is no "frame," instead there is an asynchronous stream of photodiode AEs. In this example, there would likely be a large number of photodiode AEs associated with the object 130 as relative intensity changes would likely occur due to movement. In contrast, a much smaller number (and potentially no) photodiode AEs associated with the object 120 would occur as there would be minimal change in relative intensity values. But, in conventional mode, each photodiode of the event sensor outputs a photodiode value that is based on an amount of light collected over an integration period. Therefore, whether an object is static or dynamic has no effect on the size of the image frame. In some embodiments, the event camera 105 can interleave a series of event frames with one or more image frames to create, e.g., a low bandwidth video.

Figure 2:
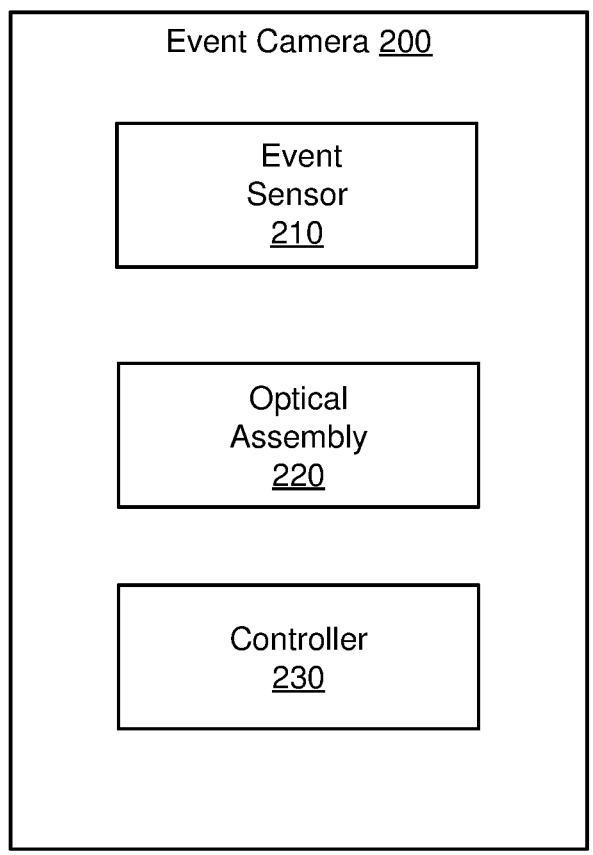
FIG. 2 is a high-level block diagram illustrating an event camera, in accordance with an embodiment.

FIG. 2 is a high-level block diagram of an event camera 200 in accordance with one embodiment. The embodiment of the event camera 105 illustrated in FIG. 2 is composed of an event sensor 210, an optical assembly 220, and a controller 230. Some embodiments of the event camera 200 have different modules or components than those described in conjunction with FIG. 2. Similarly, the functions further described below may be distributed among components of the event camera 200 in a different manner than described in conjunction with FIG. 2.

The event sensor 210 captures images of a local area in accordance with imaging instructions. Imaging instructions are instructions that cause the event sensor 210 to capture one or more images. Imaging instructions may include, e.g., mode type (i.e., even mode or conventional mode), frame rate, number of frames, shutter speed, some other factor that affects image capture, photodiode threshold value, event frame period, or some combination thereof. The captured images may be, e.g., one or more event frames, one or more image frames, or some combination thereof. The event sensor 210 includes a plurality of photodiodes. In an event mode, each of the plurality photodiodes independently and in continuous time quantizes local relative intensity changes in the local area. As noted above, a relative intensity change is measured against a prior intensity value (i.e., the previous intensity value of the photodiode). In an event mode of operation, for each photodiode, if a change in intensity over an event frame period relative to a previous is more than a photodiode threshold value, the photodiode outputs a specific data value. An event frame period is a period of time. If the change in intensity is less than the threshold value over the event frame period, no data value is output for that photodiode. Accordingly, in an event mode of operation not every photodiode may actually output a data value.

Note that because each photodiode generates a data value based on whether or not a change in intensity over a particular time period compared to its previous intensity value is more than a threshold value, the photodiodes in the event sensor 210 are generating data values in an asynchronous manner. The event sensor 210 gathers generated data values for a specific period of time, and uses the gathered data values to generate an event frame. The specific period of time may be, e.g., 160 ms, or some other value. In some embodiments, this period of time may be adjustable by a user of the event camera 120 and/or may be determined by e.g., the controller 230.

The event sensor 210 may also operate in a conventional mode of operation. As noted above, in a conventional mode of operation the event sensor 210 functions as a traditional imaging sensor, and outputs an image frame that includes data from each of the photodiodes in the event sensor 210.

The optical assembly 220 directs light from a local area to the event sensor 210. The optical assembly includes one or more optical elements. An optical element may be, e.g., a positive lens, a negative lens, a prism, a filter, a diffractive element, an aperture, or some combination thereof. In some embodiments, one or more of the optical elements may have one or more coatings (e.g., anti-reflection coating, IR coating, etc.). In some embodiments, the optimal assembly 220 may be able to dynamically adjust its focal length (e.g., zoon) and/or aperture.

The controller 230 controls the event sensor 210, and in some embodiments the optics assembly 220. The controller 230 generates imaging instructions and provides the imaging instructions to the event sensor 210 and/or the optics assembly 220. In some embodiments, the controller generates the imaging instructions based upon input from a user of the event camera 200 and/or a console. In other embodiments, the controller 230 may automatically generate the imaging instructions.

The controller 230 generates images using data from the event sensor 210. The controller generates an image based on solving an image equation:

$$Ax=y \qquad (1)$$

where A is an event matrix, x is an intensity matrix and y is a change matrix. The event matrix (A) is a N×n sparse matrix whose columns are representative of a specific photodiode and whose rows are representative of a specific time an AE occurred. N is the number of photodiodes in the event sensor, and n is a number of AEs that have occurred. The change matrix (y) is a 1×n vector of threshold intensity values. Each value of the change matrix is either $-\tau$ or $+\tau$, where $\tau$ is the data value output by the photodiode. The intensity matrix (x) is a 1×n vector, whose values describe intensity values of the photodiodes where an AE occurred.

As discussed in detail below with regard to FIG. 3, for a first time period, the controller 230 populates the event matrix based in part on data values asynchronously received from the event sensor 210 and positions of photodiodes associated with the received data values over a first time period. The controller 230 populates a change matrix based in part on the threshold intensity values of the photodiodes associated with the received data values over the first time period. The controller 230 then generates generate an image for the first time period using the event matrix and the change matrix. The controller 230 would then repeat the above process for subsequent time periods to generate subsequent images.

Figure 3:
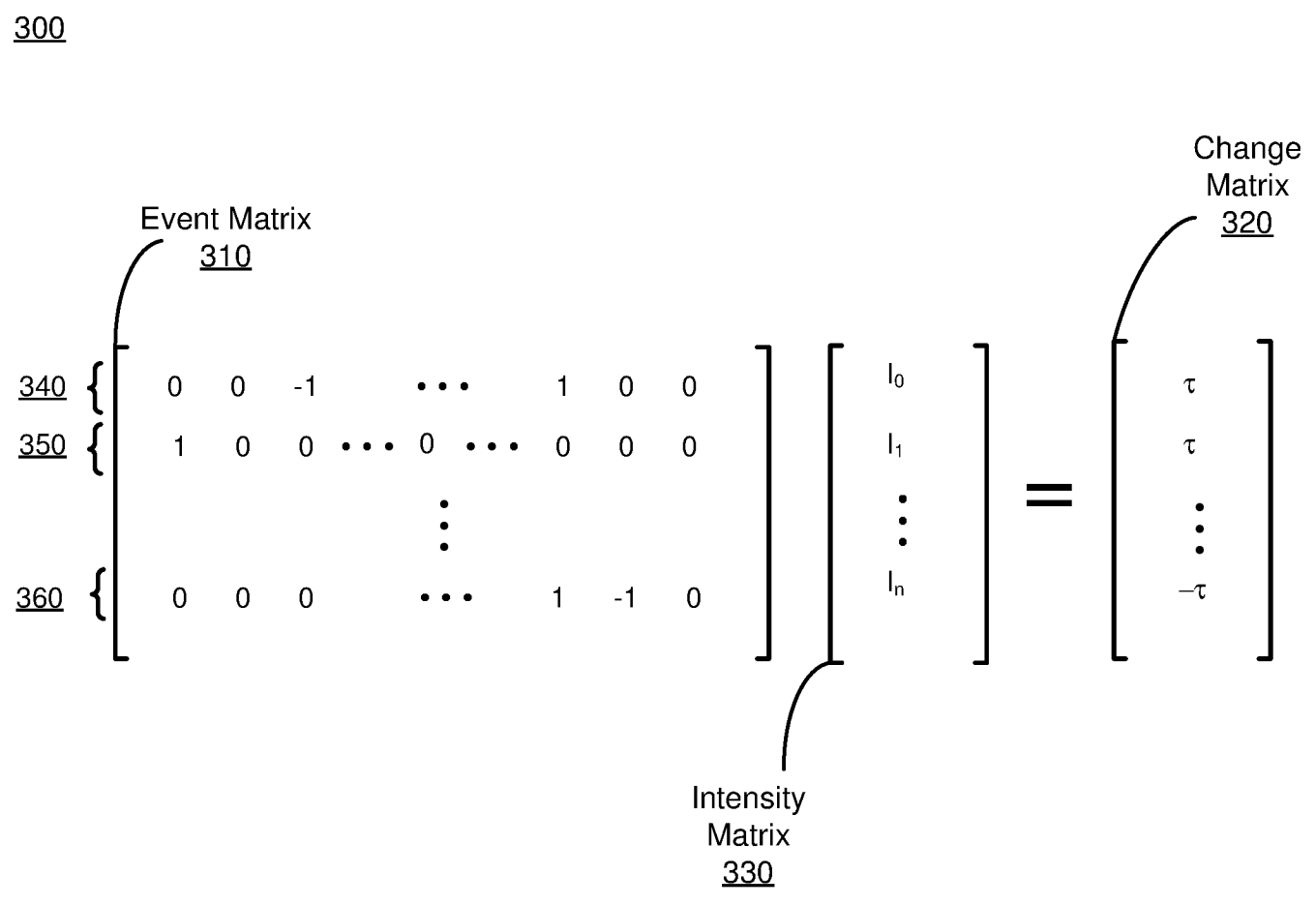

FIG. 3 is an example of an image equation 300 that is populated over a first time period, according to an embodiment. The image equation 300 includes an event matrix 310, a change matrix 320, and an intensity matrix 330.

The event matrix 310 describes AEs that have occurred over the first time period. Each row in the event matrix 310 corresponds to data collected from an AE for a single pixel. Furthermore, each row in the event matrix 310 corresponds to detection of a single AE. Thus each time an AE is detected, a new row is added to the event matrix 310. Each column in the event matrix 310 corresponds to a specific location in the location area being imaged by the event camera. A value of '0' indicates that no AE occurred at a specific location, and a value of '1' or '−1' indicates that an AE did occur. Specifically, a value of '−1' is inserted at a location of the image at which the associated photodiode detected an AE during the previous time period, and a value of '1' is inserted at the location of an image at which the associated photodiode detected an AE during the current time period. Accordingly, the event matrix 310 is a sparse matrix, where each row has at most two non-zero values, and those values are either 1 or −1. Note that AEs occur asynchronously, accordingly, row 340 may be associated with an AE that occurred at 1 ms, row 350 may be associated with an AE that occurred at 1.1 ms, and row 350 may be associated with an AE that occurred at 10.07 ms.

For each AE occurrence, a new row is added to the change matrix 320. A value input into the new row of the change matrix 320 is either −τ or +τ, where τ is the photodiode value that is output by the photodiode as part of the AE. The value of τ is determined by the settings of the controller 230. In one embodiment, the controller 230 may specify a single value of τ throughout the entire operation of the event camera. In an alternative embodiment, the value of τ specified by the controller 230 may change depending on observations from the event sensor 210. In some embodiments, the settings of the controller 230, and thus the value of τ, may be set based on input from a user of the event camera and/or a console. In other embodiments, the controller 230 may automatically generate values of τ.

With the event matrix 310 and the change matrix 320 populated, the equation o300 can be solved for the intensity matrix 330. The intensity matrix 330 represents data describing the magnitude and direction (e.g. negative or positive) of AE at all pixels within a generated image. The intensity matrix 330 is a matrix representing intensity values of the pixels in an image. Each value of the intensity matrix 330 is unknown, however, they may be solved for as the values of the event matrix 310 and the change matrix 320 are known. Moreover, as the event matrix 310 is a sparse matrix, the values of the intensity matrix 330 may be solved for rapidly (e.g. using Second Order Cone programs).

In some embodiments, the data output from intensity matrix 330 is used in image generation. In an alternative embodiments, the data may be subject to additional constraints prior to its use in image generation. For example, an image of the same scene generated at the same point in time by the event camera operating in a conventional mode of operation may be used to constrain the data output from the intensity matrix 330. In a further embodiment, the generated image may be edited for errors or gaps in data using data from pre-existing model distributions. Such editing may be utilized to prevent unnatural events from being displayed or to ensure generation of natural-appearing images. One example in which such editing may be used is imaging of a static object such as a smooth table. In this case, the event mode of operation may have a number of AEs below some threshold number associated with adequate visibility of the object in the final image. In these cases, use of data from one or more images taken in conventional mode of operation may be used to e.g., visualize objects that are static relative to the event camera.

Note that generation of images based on changes in relative intensity facilitates sparse population of the event matrix 310. This low volume throughput of data improves the efficiency of image generation compared to the traditional frame capture mode of operation. Moreover, operation of the event camera in the event mode of operation also may utilize less power, memory, and time to generate an image.

FIG. 4 is a flow chart illustrating a process 400 for generating an image using an event camera, in accordance with one embodiment. The process 400 may be performed by an event camera (e.g., the event camera 200). In some embodiments, other entities may perform some or all of the steps of the process in other embodiments. Likewise, embodiments may include different and/or additional steps, or perform the steps in different orders.

The event camera captures 410 data in accordance with image instructions. The event camera determines a mode of operation from the image instructions, and collects data in accordance with the determined mode of operation. For example, in in a conventional mode of operation data values from each photodiode in an event sensor of the event camera are output for a particular time interval. In other embodiments, where the determined mode of operation is an event mode, AEs may be output from the event sensor.

The event camera generates 420 an image based on the captured data. In a conventional mode of operation, the event camera forms an image frame using photodiode values read out from the entire event sensor. In contrast, in event mode, the event camera generates an image using the AEs output from the event sensor. The event mode of operation is described in detail below with regard to FIG. 5.

Figure 5:
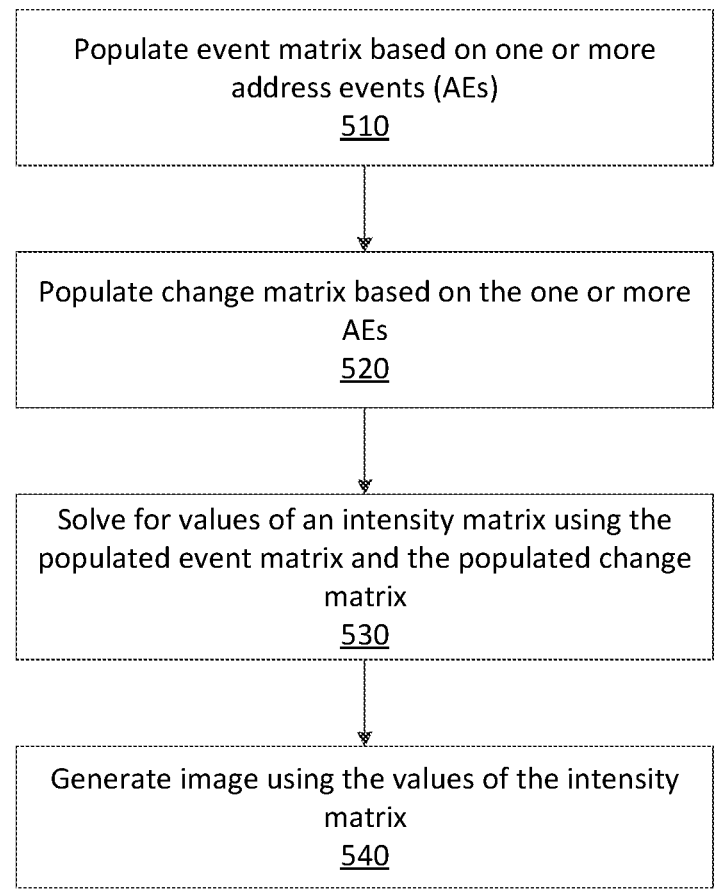
FIG. 5 is a flow chart illustrating a process for generating an image using a camera operating in an event driven mode of operation, in accordance with one embodiment.

FIG. 5 is a flow chart illustrating a process for generating an image using an camera operating in an event driven mode of operation, in accordance with one embodiment. The process 500 may be performed by an event camera (e.g., the event camera 200). In some embodiments, other entities may perform some or all of the steps of the process in other embodiments. Likewise, embodiments may include different and/or additional steps, or perform the steps in different orders.

The event camera populates 510 an event matrix (e.g., the event matrix 310) based on one or more AEs. As noted above with regard to FIG. 3, the event camera populates the event matrix 510 as AEs occur. Each time an AE is detected, a new row is added to the event matrix 510. A value of '0' within the event matrix 510 indicates that no AE occurred at a specific location, and a value of '1' or '−1' indicates that an AE did occur. Specifically, a value of '−1' is inserted at a location of the image at which the associated photodiode detected an AE during the previous time period, and a value of '1' is inserted at the location of an image at which the associated photodiode detected an AE during the current time period. Accordingly, the event matrix 510 is a sparse matrix, where each row has at most two non-zero values, and those values are either 1 or −1.

The event camera populates 520 a change matrix (e.g., the change matrix 320) based on the one or more AEs. The change matrix 520 is part of the image equation (1) discussed above. The event camera populates the change matrix 520 as AEs occur. Specifically, for each AE occurrence, a new row is added to the change matrix 520. A value input into the new row of the change matrix 520 is either −τ or +τ, where ti is the photodiode value that is output by the photodiode as part of the AE. As explained above, the value of τ is determined by the settings of the controller. In one embodiment, the controller may specify a single value of τ throughout the entire operation of the event camera. In an alternative embodiment, the value of τ specified by the controller may change depending on observations from the event sensor.

The event camera solves 530 for values of an intensity matrix (e.g., the intensity matrix 330) using the populated event matrix 510 and the populated change matrix 520. The intensity matrix 530 represents data describing the magnitude and direction (e.g. negative or positive) of an AE at all pixels within a generated image. The intensity matrix 530 is a matrix representing intensity values of the pixels in an image. Each value of the intensity matrix 530 is unknown, however, they may be solved for as the values of the event matrix 510 and the change matrix 520 are known. Moreover, as the event matrix 510 is a sparse matrix, the values of the intensity matrix 530 may be solved for rapidly (e.g. using Second Order Cone programs).

The event camera generates 540 an image using the values of the intensity matrix. In some embodiments, the event camera generates the image using portions of one or more image frames captured by the event camera (e.g., while operating in a conventional mode). For example, the event camera may first operate in a conventional mode of operation and take one or more image frames, and then operate in an event mode of operation. The camera can then use the one or more image frames in image generation using the solved intensity values. In another embodiment, the generation of the image may be subject to constraints established by an image captured in the conventional mode of operation of the event camera. In a further embodiment, the generated image may be edited for errors or gaps in data using data from pre-existing model distributions. Such editing may be utilized to prevent unnatural events from being displayed or to ensure generation of natural-appearing images.

Figure 6:
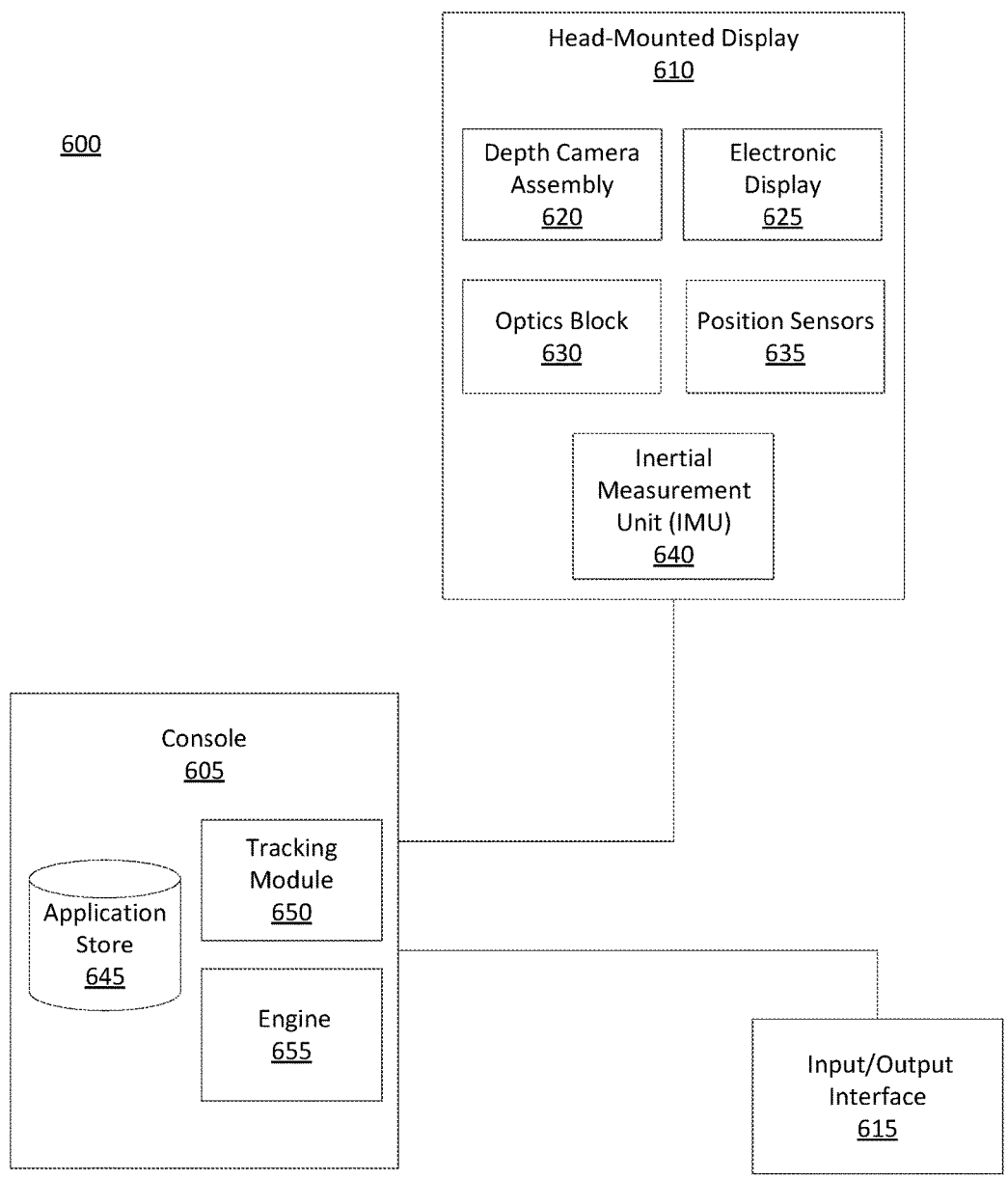
FIG. 6 is a block diagram of a HMD system environment, in accordance with an embodiment.

Tuning now to a possible implementation of an event camera, FIG. 6 is a block diagram of a HMD system environment 600 in which a HMD console 605 operates. The HMD system 600 may operate in a VR system environment, an AR system environment, a MR system environment, or some combination thereof. The system environment 600 shown by FIG. 6 includes a HMD 610 and an input/output (I/O) interface 615 that are each coupled to the HMD console 605. While FIG. 6 shows an example system 600 including one HMD 610 and one I/O interface 615, in other embodiments any number of these components may be included in the system 600. For example, there may be multiple HMDs 610, each having an associated I/O interface 615, and communicating with the HMD console 605. In alternative configurations, different and/or additional components may be included in the system environment 600. Similarly, functionality of one or more of the components can be distributed among the components in a different manner than is described here. For example, some or all of the functionality of the HMD console 605 may be contained within the HMD 610.

The HMD 610 is a head-mounted display that presents content to a user comprising virtual and/or augmented views of a physical, real-world environment with computer-generated elements (e.g., two-dimensional (2D) or 3D images, 2D or 3D video, sound, etc.). In some embodiments, the presented content includes audio that is presented via an external device (e.g., speakers and/or headphones) that receives audio information from the HMD 610, the console 605, or both, and presents audio data based on the audio information. The HMD 610 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. Some embodiments of the HMD 610 are further described below in conjunction with FIG. 7.

The HMD 610 includes a depth camera assembly 620, an electronic display 625, an optics block 630, one or more position sensors 635, and an inertial measurement unit (IMU) 640. Some embodiments of the HMD 610 have different components than those described here. Similarly, the functions can be distributed among other components in the HMD system 600 in a different manner than is described here.

The DCA 620 captures data describing depth information of an area surrounding the HMD 610. The data describing depth information may be associated with one or a combination of the following techniques used to determine depth information: structured light, time of flight, or some combination thereof. The DCA 620 can compute the depth information using the data, or the DCA 620 can send this information to another device such as the console 605 that can determine the depth information using data from the DCA 620.

The DCA 620 includes an illumination source, an imaging device, and a controller. The illumination source emits light onto an area surrounding the HMD 610. In some embodiments, the emitted light is structured light, which may be in the Infrared. The illumination source includes a plurality of emitters on a single substrate. In some embodiments, the imaging device is an event camera (e.g., the event camera 200). The imaging device captures ambient light and light from one or more emitters of the plurality of emitters of the plurality of emitters that is reflected from objects in the area. The controller coordinates how the illumination source emits light and how the imaging device captures light. In some embodiments, the controller may also determine depth information associated with the local area using the captured images.

The illumination source of the DCA 620 includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic light emitting diodes (LEDs), a vertical-cavity surface-emitting laser (VCSEL), or some other source. In some embodiments, a single emitter or a plurality of emitters in the illumination source can emit light having a structured light pattern.

The electronic display 625 displays 2D or 3D images to the user in accordance with data received from the console 910. In various embodiments, the electronic display 625 comprises a single electronic display or multiple electronic displays (e.g., a display for each eye of a user). Examples of the electronic display 625 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 625 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display 625.

The optics block 630 magnifies received light from the electronic display 625, corrects optical errors associated with the image light, and the corrected image light is presented to a user of the HMD 610. The optics block 630 is an optical element, such as an aperture, a Fresnel lens, a convex lens, a concave lens, a filter, or any other suitable optical element that affects the image light emitted from the electronic display 625. Moreover, the optics block 630 may include combinations of different optical elements. In some embodiments, one or more of the optical elements in the optics block 630 may have one or more coatings, such as partial reflectors or anti-reflective coatings.

Magnification of the image light by the optics block 630 allows the electronic display 625 to be physically smaller, weigh less, and consume less power than larger displays. Additionally, magnification may increase a field of view of the displayed media. For example, the field of view of the displayed media is such that the displayed media is presented using almost all (e.g., 110° diagonal), and in some cases all, of the user's instantaneous field of view. In some embodiments, the effective focal length the optics block 630 is larger than the spacing to the electronic display 625. Consequently, the optics block 630 magnifies the image light projected by the electronic display 625. Additionally, in some embodiments, the amount of magnification may be adjusted by adding or removing optical elements.

The optics block 630 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 625 for display is pre-distorted, and the optics block 630 corrects the distortion when it receives image light from the electronic display 625 generated based on the content.

The IMU 640 is an electronic device that generates fast calibration data based on measurement signals received from one or more of the position sensors 635. A position sensor 635 generates one or more measurement signals in response to motion of the HMD 610. Examples of position sensors 635 include: one or more accelerometers, one or more gyroscopes, one or more magnetometers, another suitable type of sensor that detects motion, a type of sensor used for error correction of the IMU 640, or some combination thereof. The position sensors 635 may be located external to the IMU 640, internal to the IMU 625, or some combination thereof.

Based on the one or more measurement signals from one or more position sensors 635, the IMU 640 generates fast calibration data indicating an estimated position of the HMD 610 relative to an initial position of the HMD 610. For example, the position sensors 635 include multiple accelerometers to measure translational motion (forward/back, up/down, left/right) and multiple gyroscopes to measure rotational motion (e.g., pitch, yaw, roll). In some embodiments, the IMU 640 rapidly samples the measurement signals and calculates the estimated position of the HMD 610 from the sampled data. For example, the IMU 640 integrates the measurement signals received from the accelerometers over time to estimate a velocity vector and integrates the velocity vector over time to determine an estimated position of a reference point on the HMD 610. Alternatively, the IMU 640 provides the sampled measurement signals to the HMD console 605, which determines the fast calibration data. The reference point is a point that may be used to describe the position of the HMD 610. While the reference point may generally be defined as a point in space; however, in practice the reference point is defined as a point within the HMD 610 (e.g., a center of the IMU 640).

The IMU 640 receives one or more calibration parameters from the console 605. As further discussed below, the one or more calibration parameters are used to maintain tracking of the HMD 610. Based on a received calibration parameter, the IMU 640 may adjust one or more IMU parameters (e.g., sample rate). In some embodiments, certain calibration parameters cause the IMU 640 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

In embodiments not shown, the HMD 610 may also include an eye tracking system. The eye tracking system includes a camera configured to capture images of one or both eyes of the user. In some embodiments, the camera is an event camera (e.g., the event camera 200). The eye tracking system generates eye tracking information (e.g., gaze angle) using the captured images.

The I/O interface 615 is a device that allows a user to send action requests to the HMD console 605. An action request is a request to perform a particular action. For example, an action request may be to start or end an application or to perform a particular action within the application. The I/O interface 615 may include one or more input devices. Example input devices include: a keyboard, a mouse, a game controller, or any other suitable device for receiving action requests and communicating the received action requests to the HMD console 605. An action request received by the I/O interface 615 is communicated to the HMD console 605, which performs an action corresponding to the action request. In some embodiments, the I/O interface 615 may provide haptic feedback to the user in accordance with instructions received from the HMD console 605. For example, haptic feedback is provided when an action request is received, or the HMD console 605 communicates instructions to the I/O interface 615 causing the I/O interface 615 to generate haptic feedback when the HMD console 605 performs an action.

The console 605 provides media to the HMD 610 for presentation to the user in accordance with information received from one or more of: the event camera 650, the HMD 610, and the I/O interface 615. In the example shown in FIG. 6, the HMD console 605 includes an application store 645, a tracking module 650, and an engine 655. Some embodiments of the HMD console 605 have different modules than those described in conjunction with FIG. 6. Similarly, the functions further described below may be distributed among components of the HMD console 605 in a different manner than is described here.

The application store 645 stores one or more applications for execution by the HMD console 605. An application is a group of instructions, that when executed by a processor, generates content for presentation to the user. Content generated by an application may be in response to inputs received from the user via movement of the HMD 610 or the I/O interface 615. Examples of applications include: gaming applications, conferencing applications, video playback application, or other suitable applications.

The tracking module 650 calibrates the HMD system 600 using one or more calibration parameters and may adjust one or more calibration parameters to reduce error in determination of the position of the HMD 610. Moreover, calibration performed by the tracking module 650 also accounts for information received from the IMU 640. Additionally, if tracking of the HMD 610 is lost, the tracking module 650 re-calibrates some or all of the system environment 600.

The tracking module 650 tracks movements of the HMD 610 using fast calibration information from the HMD 610 and/or depth information from the HMD 610. The tracking module 650 determines positions of a reference point of the HMD 610 using position information from the fast calibration information and/or the depth information. Additionally, in some embodiments, the tracking module 650 may use portions of the fast calibration information, depth information, or some combination thereof, to predict a future location of the HMD 610. The tracking module 650 provides the estimated or predicted future position of the HMD 610 to the Engine 655.

The engine 655 executes applications within the system environment 100 and receives position information, acceleration information, velocity information, predicted future positions, or some combination thereof of the HMD 610 from the tracking module 650. Based on the received information, the engine 655 determines content to provide to the HMD 610 for presentation to the user. For example, if the received information indicates that the user has looked to the left, the engine 655 generates content for the HMD 610 that mirrors the user's movement in a virtual environment. Additionally, the engine 655 performs an action within an application executing on the HMD console 605 in response to an action request received from the I/O interface 615 and provides feedback to the user that the action was performed. The provided feedback may be visual or audible feedback via the HMD 610 or haptic feedback via the I/O interface 615.

Figure 7:
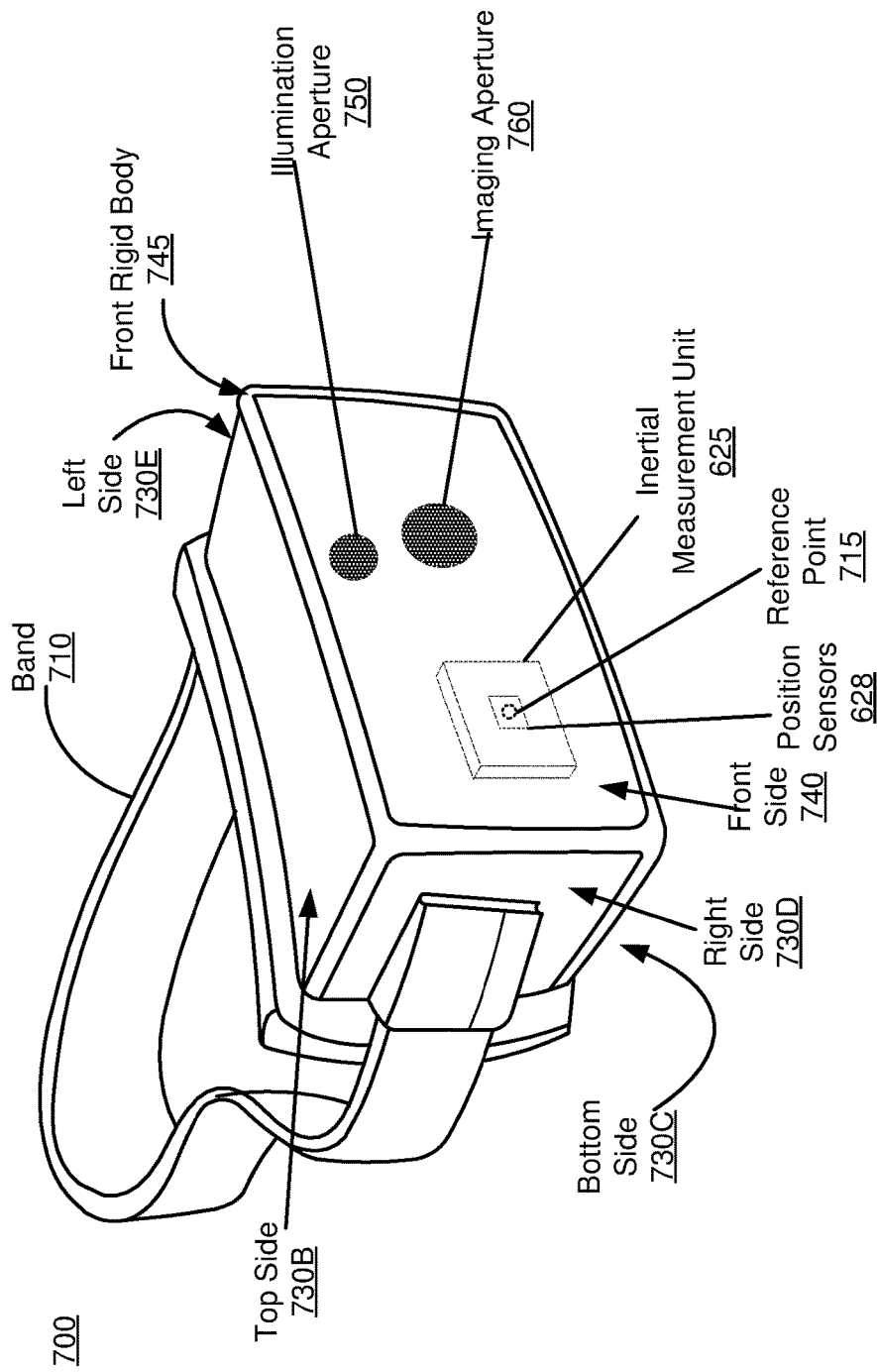
FIG. 7 is a wire diagram of a HMD, in accordance with an embodiment.

FIG. 7 is a wire diagram of a HMD headset, in accordance with an embodiment. The HMD headset 700 is an embodiment of the HMD 610. The HMD headset 700 includes a front rigid body 745, a band 710, a reference point 715, a left side 730E, a top side 730B, a right side 730D, a bottom side 730C, and a front side 740. The front rigid body 745 also includes an IMU 640, the one or more position sensors 635, and a reference point 715. In the embodiment shown by FIG. 7, the position sensors 635 are located within the IMU 640, and neither the IMU 640 nor the position sensors 635 are visible to the user.

The HMD 700 also includes a DCA (e.g., the DCA 620). Some embodiments of the DCA include a structured light emitter and an event camera. For example, the structured light emitter emits (through an illumination aperture 750) structured light towards an object, e.g., a local area or an eye of a user. The event camera captures (through an imaging aperture 760) the structured light reflected from the object and may also capture ambient light.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An imaging device comprising:
an event sensor comprising a plurality of photodiodes, the event sensor configured to operate in a mode of a plurality of modes, the plurality of modes including an event mode that causes the plurality of photodiodes to asynchronously output data values, wherein a data value output by each respective photodiode, of the plurality photodiodes, is based at least in part on a difference of a value previously output by the photodiode and an intensity value captured by the photodiode relative to a threshold intensity value; and
a controller configured to:
populate an event matrix based in part on data values asynchronously received from the sensor and positions of photodiodes associated with the received data values over a first time period, populate a change matrix based in part on the threshold intensity value and the photodiodes associated with the received data values over the first time period, and generate an image for the first time period using the event matrix and the change matrix, based in part on solving for an intensity matrix using the equation:

$$Ax=y$$

where A is the event matrix,
y is the change matrix, and
x is the intensity matrix.

2. The imaging device of claim 1, wherein the plurality of modes includes a conventional mode that causes the plurality of photodiodes to each output an intensity value that is used to generate an image frame.

3. The imaging device of claim 2, wherein the controller is further configured to:
generate imaging instructions that determine what mode the event sensor operates in, wherein the imaging instructions cause the event sensor to operate in the conventional mode for a first time period, and then operate in the event mode for a second time period that is subsequent to the first time period; and
provide the imaging instructions to the event sensor.

4. The imaging device of claim 1, wherein the photodiodes are configured to output data values after an absolute value of the difference between the data value and the value previously output by the photodiode is greater than the threshold intensity value.

5. The imaging device of claim 4, wherein the threshold intensity value is based on a statistical distribution of expected threshold intensities.

6. The imaging device of claim 1, wherein the threshold intensity value is determined by the controller.

7. The imaging device of claim 1, wherein populating an event matrix based in part on data values asynchronously received from the sensor and positions of photodiodes associated with the received data values over a first time period, comprises:
for each of the received data values that indicate that an address event (AE) occurred over the first time period, adding a new row to the event matrix;
inserting a value of '0' at locations within the new row of the event matrix that are associated with positions of photodiodes that are associated with received data values that indicate no AE occurred over the first time period;
inserting a value at locations within the new row of the event matrix that are associated with positions of photodiodes that are associated with received data values that indicate that an AE occurred over a time period prior to the first time period; and
inserting a different value at locations within the new row of the event matrix that are associated with positions of photodiodes that are associated with received data values that indicate than an AE occurred over the first time period.

8. The imaging device of claim 1, wherein populating a change matrix based in part on the threshold intensity value and the photodiodes associated with the received data values over the first time period, comprises:
for each of the received data values that indicate that an address event (AE) occurred over the first time period, adding a new row to the change matrix; and
inserting a value that is a multiple of the received data value that indicates that the AE occurred in one or more positions in the new row.

9. The imaging device of claim 1, wherein the imaging device is part of an apparatus selected from a group consisting of: a head-mounted display, a machine vision system, an eye tracking system, a depth camera assembly, and a cellphone.

10. An imaging device comprising:
an event sensor comprising a plurality of photodiodes, the event sensor configured to operate in a mode of a plurality of modes, the plurality of modes including an event mode that causes the plurality of photodiodes to asynchronously output data values, wherein a data value output by each respective photodiode, of the plurality photodiodes, is based at least in part on a difference of a value previously output by the photodiode and an intensity value captured by the photodiode relative to a threshold intensity value;
an optical assembly configured to direct light from a local area in a field of view of the imaging device to the event sensor; and
a controller configured to:
populate an event matrix based in part on data values asynchronously received from the sensor and positions of photodiodes associated with the received data values over a first time period,
populate a change matrix based in part on the threshold intensity value and the photodiodes associated with the received data values over the first time period, and
generate an image for the first time period using the event matrix and the change matrix, based in part on solving for an intensity matrix using the equation:

$$Ax=y$$

where A is the event matrix,
y is the change matrix, and
x is the intensity matrix.

11. The imaging device of claim 10, wherein the plurality of modes includes a conventional mode that causes the plurality of photodiodes to each output an intensity value that is used to generate an image frame.

12. The imaging device of claim 11, wherein the controller is further configured to:
generate imaging instructions that determine what mode the event sensor operates in, wherein the imaging instructions cause the event sensor to operate in the conventional mode for a first time period, and then operate in the event mode for a second time period that is subsequent to the first time period; and
provide the imaging instructions to the event sensor.

13. The imaging device of claim 10, wherein the photodiodes are configured to output data values after an absolute value of a the difference between the data value and the value previously output by the photodiode is greater than the threshold intensity value.

14. The imaging device of claim 13, wherein the threshold intensity value is based on a statistical distribution of expected threshold intensities.

15. The imaging device of claim 10, wherein the threshold intensity value is determined by the controller.

16. The imaging device of claim 10, wherein the imaging device is part of an apparatus selected from a group consisting of: a head-mounted display, a machine vision system, an eye tracking system, a depth camera assembly, and a cellphone.

17. A non-transitory computer-readable storage medium storing executable computer program instructions, the instructions executable to perform steps comprising:
    populating an event matrix based in part on:
        data values asynchronously received from an event sensor comprising a plurality of photodiodes, the event sensor configured to operate in an event mode that causes the plurality of photodiodes to asynchronously output data values, wherein a data value output by each respective photodiode, of the plurality photodiodes, is based at least in part on a difference of a value previously output by the photodiode and an intensity value captured by the photodiode relative to a threshold intensity value, and
        positions of photodiodes associated with the received data values over a first time period;
    populating a change matrix based in part on the threshold intensity value and the photodiodes associated with the received data values over the first time period; and
    generating an image for the first time period using the event matrix and the change matrix, based in part on solving for an intensity matrix using the equation:

$$Ax=y$$

where A is the event matrix,
    y is the change matrix, and
    x is the intensity matrix.

\* \* \* \* \*

UNITED STATES PATENT AND TRADEMARK OFFICE
CERTIFICATE OF CORRECTION

PATENT NO.         : 10,237,481 B2
APPLICATION NO.    : 15/490679
DATED              : March 19, 2019
INVENTOR(S)        : Richard Andrew Newcombe et al.

It is certified that error appears in the above-identified patent and that said Letters Patent is hereby corrected as shown below:

In the Claims

Column 13, Claim 7, Line 59, delete "than" and insert --that-- therefor
Column 14, Claim 13, Line 55, after "of", delete "a"

Signed and Sealed this
Fifteenth Day of October, 2019

Andrei Iancu
*Director of the United States Patent and Trademark Office*